Dec. 31, 1957   J. P. HOOTEN   2,818,188
BOAT TRAILER
Filed Dec. 29, 1955   3 Sheets-Sheet 2
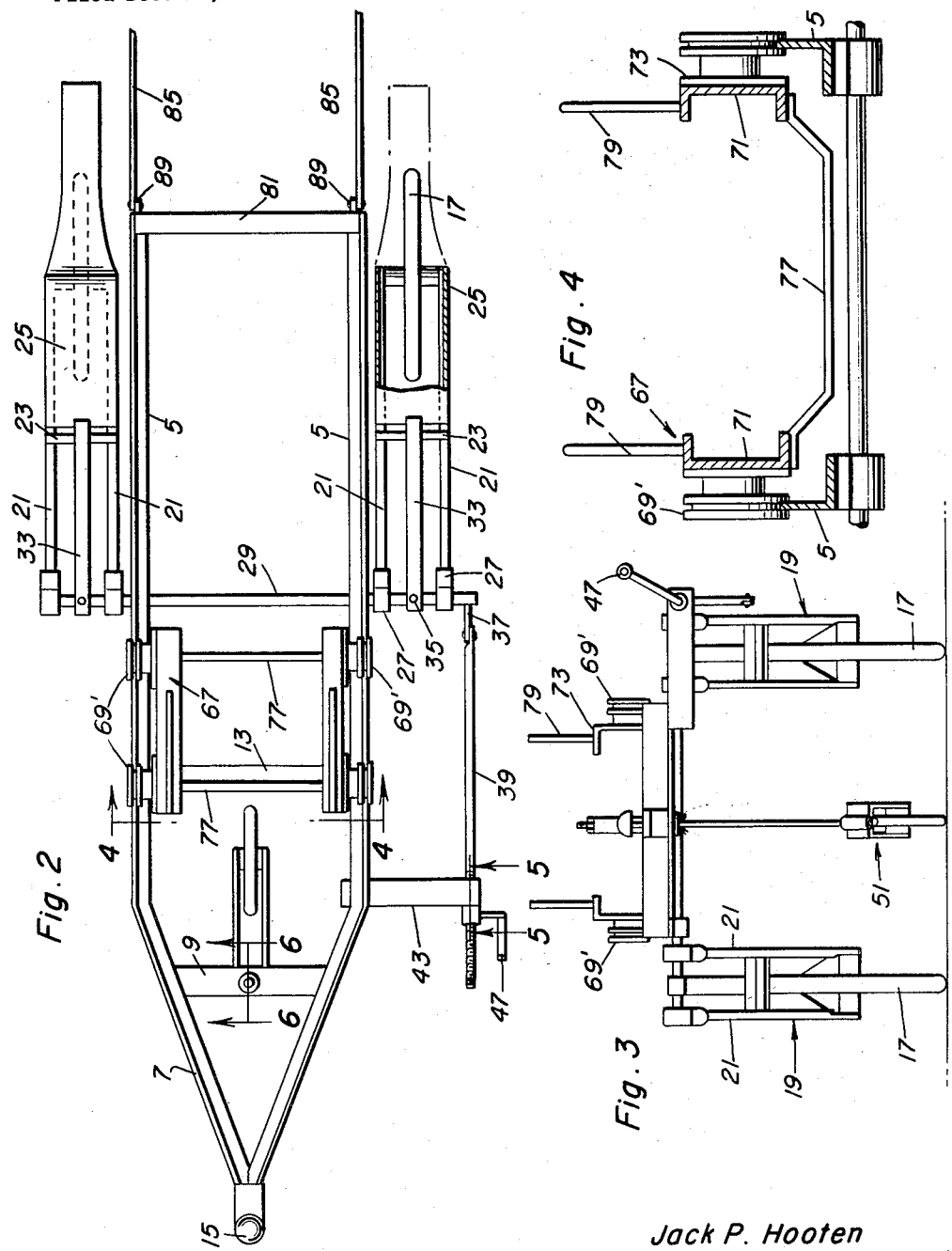
Jack P. Hooten
INVENTOR.
BY Clarence A. O'Brien
and Harvey B. Jacobson
Attorneys Dec. 31, 1957  J. P. HOOTEN  2,818,188
BOAT TRAILER
Filed Dec. 29, 1955  3 Sheets-Sheet 3
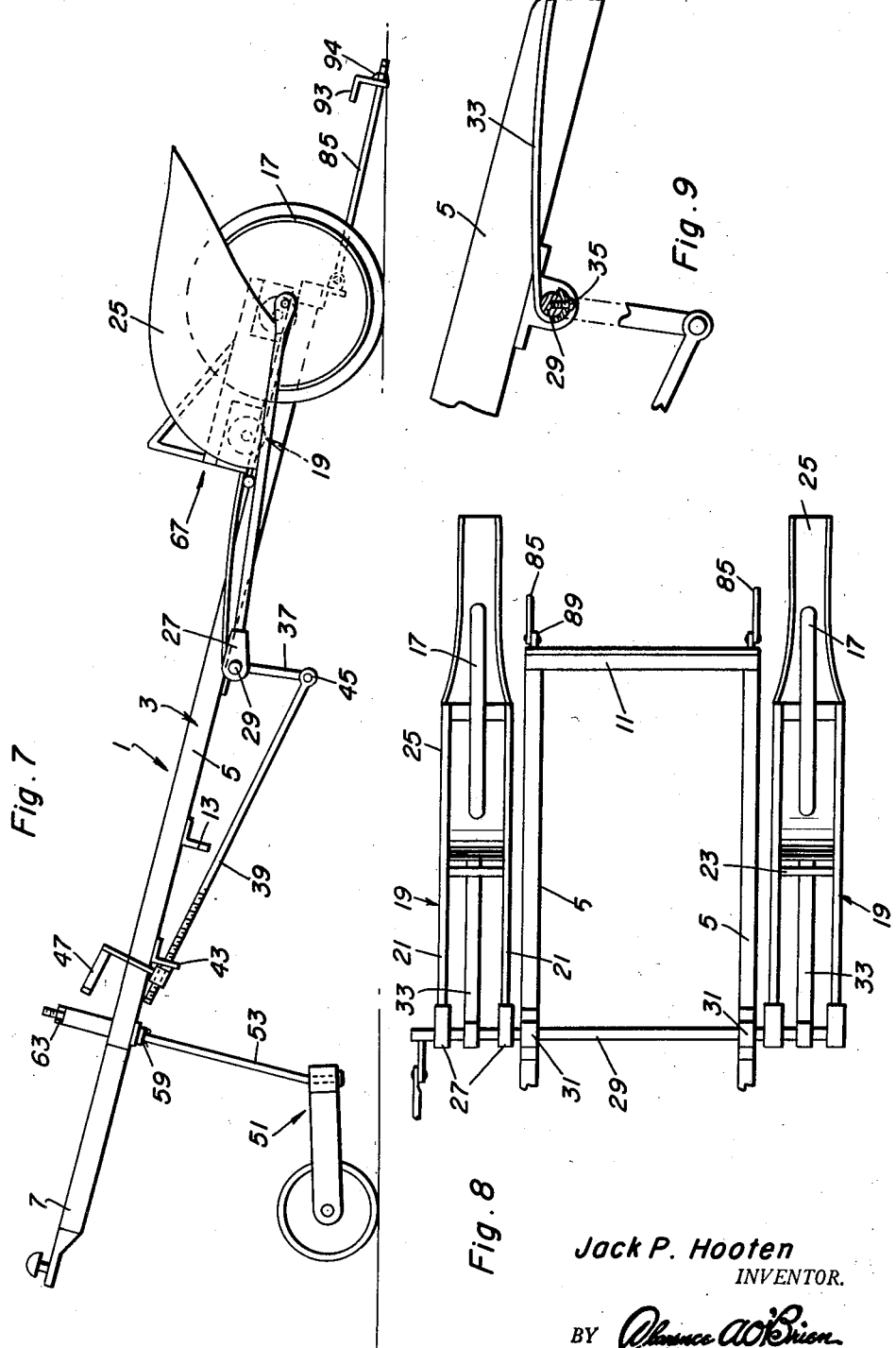
Jack P. Hooten
INVENTOR.

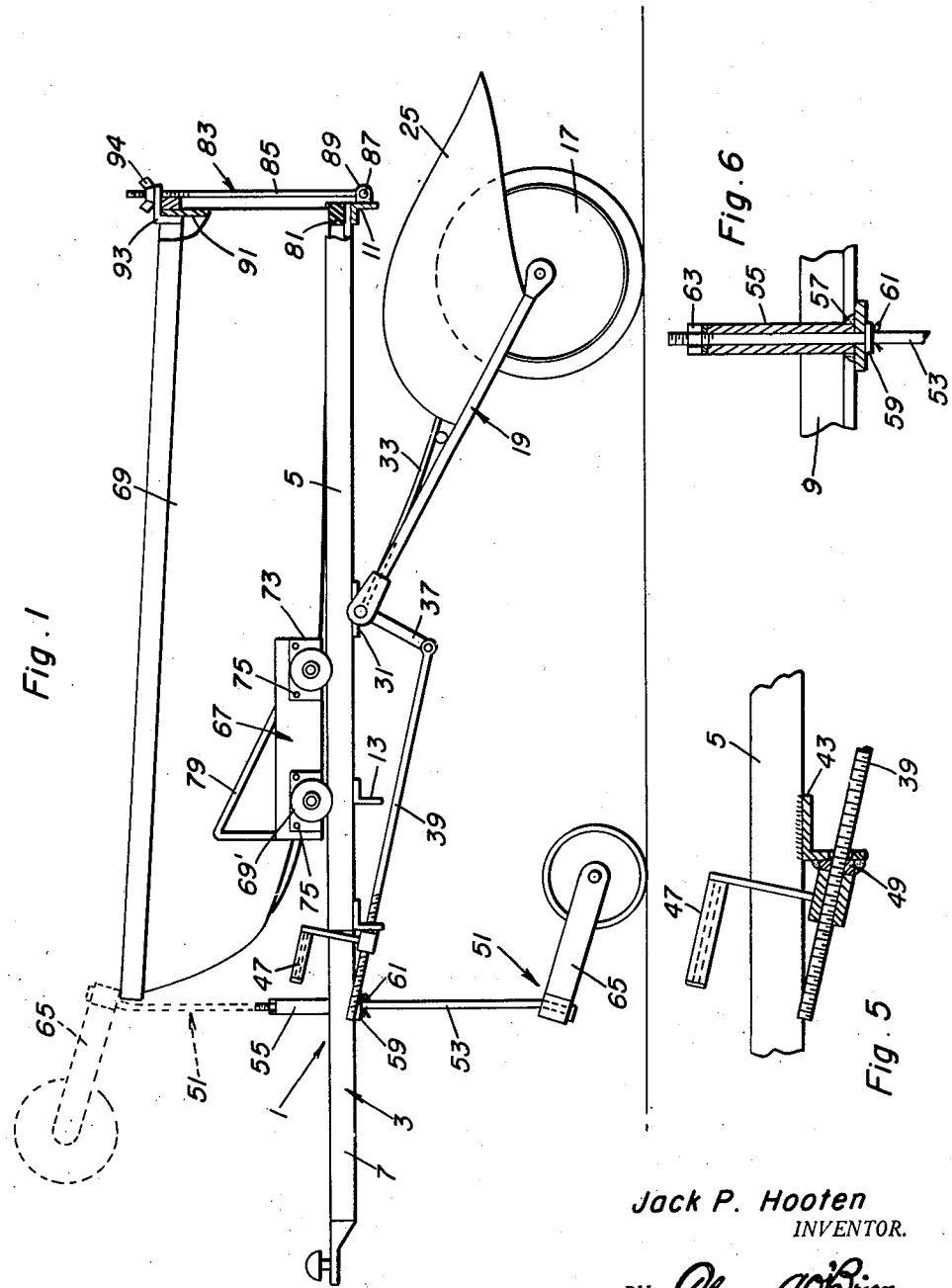

United States Patent Office 2,818,188
Patented Dec. 31, 1957

2,818,188

BOAT TRAILER

Jack P. Hooten, Nowata, Okla.

Application December 29, 1955, Serial No. 556,207

3 Claims. (Cl. 214—506)

My invention relates to improvements in boat trailers for transporting and launching small boats such as rowboats, launches and the like.

The primary object of my invention is to provide a boat trailer for towing by an automobile to transport a boat and which embodies a chassis frame adapted to be tilted downwardly and rearwardly for launching the boat, or loading the same when the trailer is backed into the shallow water.

Another object is to provide a boat trailer for the above purposes equipped with vertically swingable rear wheel mounting frames swingable in one direction to lower the rear end of the chassis frame into tilted position for launching a boat therefrom and swingable in the opposite direction to raise the rear end of the chassis frame for raising a boat out of the water into transporting position together with operating means for easily swinging the wheel mountings to raise the rear end in opposition to the weight of a boat on the chassis frame.

Still another object is to provide a trailer for the above purposes which is strong yet light in weight, easy to operate by one man, safe to use and comparatively inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a view in side elevation, partly in section of my improved trailer with the chassis frame in boat transporting position and a boat loaded thereon;

Figure 2 is a view in plan partly broken away and shown in section of the trailer with the hold down yoke swung down;

Figure 3 is a view in front elevation;

Figure 4 is an enlarged fragmentary view in transverse section taken on the line 4—4 of Figure 2;

Figure 5 is a fragmentary enlarged view in longitudinal section taken on the line 5—5 of Figure 2;

Figure 6 is an enlarged fragmentary view in vertical section taken on the line 6—6 of Figure 2;

Figure 7 is a view in side elevation illustrating the chassis frame tilted downwardly and rearwardly and the hold down yoke swung down;

Figure 8 is a fragmentary view in bottom plan; and

Figure 9 is an enlarged fragmentary view partly in side elevation and partly in transverse section of parts of the operating means for the wheel mountings.

Referring to the drawings by numerals the trailer of my invention, designated generally by the numeral 1, comprises an elongated angle iron chassis frame 3 including parallel sides 5, a forwardly tapering front end section 7, a front cross bar 9 in said section 7, a rear end cross bar 11 and an intermediate cross brace 13 between said sides 5. A conventional ball hitch member 15 on the front end section 7 provides for coupling the chassis frame 3 to a tow vehicle, not shown.

A pair of rear wheels 17 are provided at opposite sides of the chassis frame 3 in a pair of mounting frames 19. The mounting frames 19 are H-shaped with a pair of opposite, spaced parallel side bars 21 extending longitudinally of the sides 5 and connected intermediate their ends by a cross bar 23. The wheels 17 are suitably mounted in the mounting frames 19 between the rear ends of the side bars 21 and rearwardly of the cross bars 23. Suitable wheel fenders 25 on the mouting frames 19 surmount the wheels 17.

The mounting frames 19 are spaced outwardly of the sides 5 and the side bars 21 thereof are provided with enlarged heads 27 journaled on opposite ends of a rock shaft 29 which extends through suitable bearings 31 on the sides 5 and is suitably spaced forwardly of the rear end cross bar 11. As will be seen the side bars 21 and hence the mounting frames 19 extend rearwardly from the rock shaft 29 and are freely swingable vertically thereon.

A pair of leaf springs 33, suitably fixed at front ends thereof, as at 35, on the rock shaft 29 extend rearwardly between the pairs of side bars 21 with their rear ends overlying and slidably engaging the cross bars 23. As will readily be seen if the rock shaft 29 is rocked clockwise as viewed in Figures 1 and 7, the springs 23 will act as resilient levers exerting downward pressure against the cross bars 23 to cause the mounting frames 19 to swing upwardly and raise the rear end of the chassis frame 3, whereas, under the weight of the chassis frame 3 the mounting frames 19 will swing downwardly to lower the rear end of the chassis frame, swing the springs 33 upwardly and rock the rock shaft 29 counter-clockwise.

Means for rocking the rock shaft 29 clockwise and releasing the same for counter-clockwise rocking comprises a crank arm 37 on said shaft, a screw feed rod 39 extending forwardly from said arms 37 and slidable in a lateral front bracket arm 43 on one side 5. The rod 39 is pivoted, as at 45, to said arm 37 and provided with a hand crank 47 threaded thereon for rotation in front of said bracket arm 43 to feed said rod 39 forwardly. A washer 49 on the rod 39 is fixed to the bracket arm 43 to act as a thrust bearing for the hand crank 47.

A caster wheel 51 is provided for supporting the front end of the chassis frame 1 when said frame is uncoupled and on which said frame 3 is tilted downwardly and rearwardly when its rear end is lowered. The caster wheel 51 includes a shank 53 removably inserted upwardly in a vertical tubular sleeve 55 welded as at 57 to and rising from the cross bar 9 centrally thereof which rests on a stop collar 59 on the shank 53 backed by a cotter pin 61. A retaining nut 63 is threaded on the shank 53 above the sleeve 55. A lateral wheel carrying fork 65 is rotatable on the lower end of the shank 53 for steering purposes. As shown in Figure 1 in broken lines the caster wheel is adapted to be inverted with the shank 53 inserted downwardly in the sleeve 55 and the fork 65 uppermost and for a purpose presently explained.

A dolly 67 is provided to run on the sides 5 for facilitating loading a boat 69 or the like on the chassis frame 3 and unloading the same from said frame. The dolly 67 comprises pairs of grooved side wheels 69' straddling the sides 5, a pair of channel side bars 71 on which said pairs of wheels 69' are suitably mounted, as by plates 73 and bolts 75, drop center cross bars 77 cross connecting the side bars 71, and a pair of inverted V-shaped side rails 79 on the side bars 71 surmounting the same for cradling the prow of a boat 69 therebetween.

A resilient cross bar 81 of rubber, or the like, extends across the rear end of the chassis frame 3 for supporting the stern end of the boat 69 and is suitably secured on the rear end cross bar 11.

A hold down yoke 83 for the stern end of the boat 69 is vertically swingable into and from upright hold down position. The hold down yoke 83 comprises a pair of rods 85 at opposite sides and the rear end of the chassis frame 3 having corresponding ends pivoted, as at 87, on ears 89 on the rear end cross bar 11 for vertical swinging into upright position behind the boat 69, an angle cross bar 93 slidable on said rods to hook over the transom 91 of the boat, and wing nuts 94 threaded onto the other ends of said rods 85 for clamping said bar 93 to said transom so that the stern of the boat is clamped between the cross bar 93 and the resilient cross bar 81.

Referring now to the operation of the trailer, as will be seen forward feed of the rod 39 by the hand crank 47 rocks the rock shaft clockwise to swing the springs downwardly and downward swinging of the springs 21 swings the mounting frames 19 upwardly to raise the rear end of the chassis frame 3 until the latter is in substantially horizontal load transporting position as shown in Figure 1. Also, the chassis frame 3 in response to weight thereof will tilt downwardly and rearwardly, the mounting frames 19 will swing downwardly and swing the springs 21 upwardly idly if the rock shaft 29 is free to rock counter-clockwise. However, in the elevated transporting position of the chassis frame 3 the hand crank 47, rod 39 and crank arm 37 form means for releasably locking the shaft 29 against rocking counter-clockwise and hence for locking the chassis frame 3 against downward tilting from load transporting position.

When it is desired to load the boat 69 onto the chassis frame 3 for transporting, the hand crank 47 is rotated to permit the rod 39 to move rearwardly together with the crank arm 37 thereby unlocking the rock shaft 29. As said rod 39 and crank arm 37 move rearwardly, the chassis frame tilts downwardly and rearwardly, the mounting frames 19 are swung downwardly and the springs 33 are swung upwardly by said frames all as shown in Figure 7. The hold down yokes 83 swing downwardly out of hold down position as shown in Figure 7. Downward tilting of the chassis frame 3 causes the dolly to gravitate to the rear end of said frame against the bar 81. The trailer 1 is now backed up to the prow of the boat 69 either on land or in water and the boat shoved onto the dolly 67 and rolled therein up said frame into loaded position as shown in Figure 1. The hold down yoke 83 is then applied in the manner already explained. The caster wheel 51 is then removed, the trailer 1 coupled to a tow vehicle and the caster wheel inverted and its shank 53 inserted downwardly in the sleeve 55 until the collar 59 rests on said sleeve. The nut 63 is then applied to the shank below said sleeve. The caster wheel 51 is now carried in upright position on the chassis frame 3 for transporting and in this position its wheel carrying fork 63 may be used as shown in dotted lines in Figure 1, to overlie and hold down the prow of the boat 69 or said prow may be suitably tied to said fork or to the shank 53.

When the boat 69 is thus loaded, the hand crank is operated to feed the rod 39 forwardly for raising the rear end of the chassis frame 3 in the manner already described, until said frame 3 is in substantially horizontal boat transporting position. In this operation said frame 3 is tilted upwardly on the hitch, or it may be tilted upwardly on the caster wheel 51 if manual propulsion of the trailer is desired.

The manner in which the trailer 1 is operated to unload a boat will be readily understood from the foregoing without further explanation. However, if is to be noted that the trailer is well adapted for backing into shallow water to load a boat thereon or to unload and launch the same and is also adapted for loading, unloading and transporting articles other than boats.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a trailer, a chassis frame, a transverse rock shaft journaled on said frame for rocking freely in opposite directions, supporting means for the front end of said frame, a pair of rear side wheels for said frame, a pair of mounting frames for said wheels freely pivoted on said shaft for vertical swinging independently thereof downwardly in response to the weight of the chassis frame to permit said chassis frame to tilt downwardly on said supporting means, said mounting frames being swingable upwardly on said shaft independently thereof to raise said frame from tilted position when said shaft is free, leaf springs fixed to said shaft for swinging against the mounting frames to swing the same upwardly upon rocking of said shaft in one direction independently of said frames and releasing said mounting frames for downward swinging of the mounting frames while said shaft is free, and manually operative means operatively connected to said shaft for rocking the same in said direction and freeing said shaft selectively.

2. The combination of claim 1, said last named means comprising a crank on said shaft operatively connected thereto, and screw feed means for operating said crank and including a screw feed shaft pivoted to said crank and slidably mounted on said frame.

3. The combination of claim 1, said supporting means comprising a caster wheel having a shank, and an upright sleeve on said chassis frame receiving said shank, said shank being removable from said sleeve and insertable therein to extend above said chassis frame for transporting of said caster wheel by said trailer.

References Cited in the file of this patent

UNITED STATES PATENTS

| | | |
|---|---|---|
| 2,453,388 | Schramm | Nov. 9, 1948 |
| 2,497,072 | Cooper | Feb. 14, 1950 |
| 2,558,418 | Brueckman | June 26, 1951 |
| 2,566,393 | Wolfe | Sept. 4, 1951 |
| 2,608,314 | Krider | Aug. 26, 1952 |
| 2,636,745 | Cartwright | Apr. 28, 1953 |
| 2,684,021 | Ratzlaff | July 20, 1954 |
| 2,711,259 | Jones | June 21, 1955 |
| 2,719,726 | Johnston | Oct. 4, 1955 |
| 2,740,543 | Mounsdon | Apr. 3, 1956 |
| 2,740,639 | Eckroad | Apr. 3, 1956 |
| 2,765,942 | Niemeier | Oct. 9, 1956 |